United States Patent [19]

Lowrance et al.

[11] Patent Number: 4,879,697
[45] Date of Patent: Nov. 7, 1989

[54] SONAR FISH FINDER APPARATUS PROVIDING SPLIT-SCREEN DISPLAY

[75] Inventors: Darrell J. Lowrance, Tulsa; Ronald G. Weber, Owasso, both of Okla.

[73] Assignee: Lowrance Electronics, Inc., Tulsa, Okla.

[21] Appl. No.: 228,680

[22] Filed: Aug. 5, 1988

[51] Int. Cl.[4] .............................................. G01S 15/96
[52] U.S. Cl. .................................... 367/111; 367/99; 367/88
[58] Field of Search .................... 367/111, 99, 88, 87; 181/123, 124; 364/561

[56] References Cited

U.S. PATENT DOCUMENTS 3,005,973 10/1961 Kietz ...................................... 367/88
4,096,484 6/1978 Ferre et al. ........................... 367/88

OTHER PUBLICATIONS

Stearns, Electronics Aboard LCD Depthfinders, Jan. 1985.
Bourne, How the Microchip Made Fish-Finders Smarter, Feb. 1985, pp. 57–61.
Eagle 3D-100 ad. in Cabelas 1988 Summer and 1987 Christmas catalogs.

*Primary Examiner*—Thomas H. Tarcza
*Assistant Examiner*—Daniel T. Pihulic
*Attorney, Agent, or Firm*—Larson and Taylor

[57] ABSTRACT

A sonar fish finder system is provided for a boat for determining and displaying the location of fish in the body of water surrounding the boat. The system includes an electromechanical transducer assembly for transmitting sound waves in the body of water along separate paths in different directions into separate areas of the body of water, for receiving corresponding echoes from obstructions in the paths (including echoes from any fish in the paths) and for generating electrical signals in accordance with the received echoes. Electrical transmitters connected to the transducer assembly control transmission of the sound waves and receivers, connected to the transducer assembly, receive and process the electrical signals produced thereby. A microprocessor unit converts the output of said receivers into electrical data representative of display images of the separate areas of the body of water and a visual display device, preferably a liquid crystal display, simultaneously displays images corresponding to the electrical data at separate side by side locations on a screen to provide separate, simultaneous indications of the presence or absence of fish in the different areas.

12 Claims, 3 Drawing Sheets

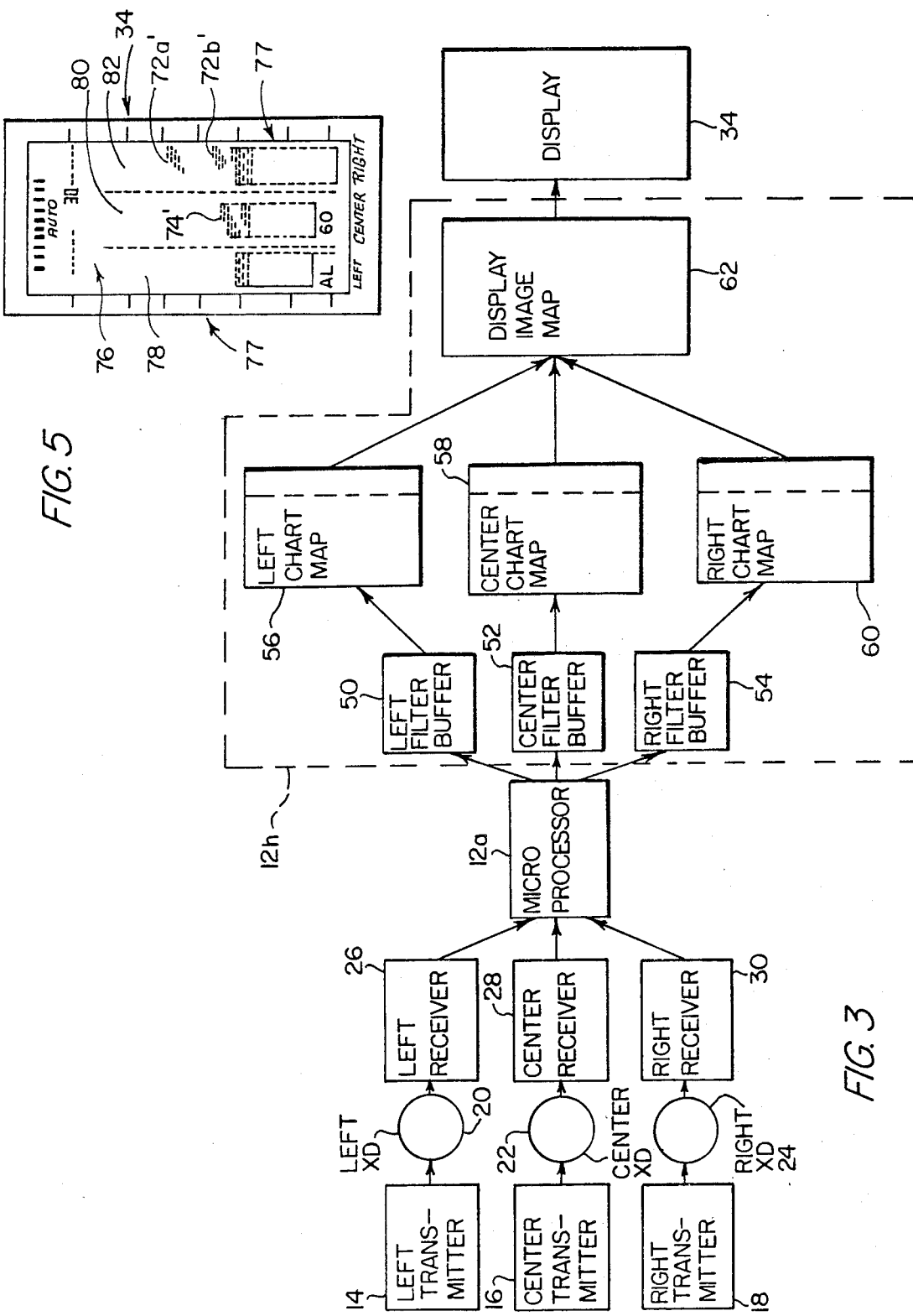

SONAR FISH FINDER APPARATUS PROVIDING SPLIT-SCREEN DISPLAY

FIELD OF THE INVENTION

The invention relates to sonar "fish finder" systems and, more particularly, to an improved system of this type providing an improved display of the sonar return signals.

BACKGROUND OF THE INVENTION

Sonar devices referred to as "fish finders" or "depth sounders" have been available for some time which are designed to provide the user with a generalized "picture" of what is under a boat or other vessel, based on the return signals produced in response to sonar transmissions into the water under the boat. However, it has only been through the use of complex and expensive "scanning" sonar systems that a fisherman has been able to tell where the fish are located below the boat and thus to determine the best side of the boat to fish from. Prior art systems have been developed which permit the fisherman to "aim" or otherwise direct sonar transducers in different directions to manually scan for fish but such systems are obviously cumbersome and inconvenient for use by a fisherman.

Scanning sonars such as those referred to above generally require mechanical rotation of a transducer within a housing to effect scanning or electrically switching between, and/or otherwise changing the phase relationship between, a plurality of transducers arranged in a hemispherical array so that as each transducer of the array is activated in turn, scanning is provided. The resultant information is then displayed on cathode ray tube or a similar display device and this display usually involves the provision of a sweeping pattern on the face of the display device which corresponds to the sweep of the transducer. Other sonar systems have also been provided which use multiple transducers oriented in different directions into the body of water under the boat and thus provide directional information in this way.

SUMMARY OF THE INVENTION

In accordance with the invention, a sonar "fish finder" system is provided which provides simplified scanning and produces an easy to use display which enables a fisherman to readily determine whether objects (including fish) are to the left or right of the boat or directly underneath. The display of the invention is particularly easy to interpret for a user that is familiar with "fish finders" or "depth sounders" with graphical readouts. Broadly speaking, the invention involves splitting the display screen into at least two, and preferably three, sections and simultaneously displaying the individual signals received from a like number of sonar transducers, with each signal being individually displayed on a separate section of the screen. As a result, with a system using three transducers, three pictures or images are simultaneously provided of three adjacent cross sections of the water to indicate what is located to the left of the boat, what is to the right of the boat and what is under the boat, in a manner readily understandable by fishermen who know how to use graph-type depth sounders or fish finders.

In accordance with a preferred embodiment of the invention a fish finder system is provided for use on a boat or other watercraft in determining the location of fish in the body of water surrounding the boat, the system comprising: electromechanical transducer means for transmitting sound waves into the body of water along at least two separate paths in different directions into separate areas of the body of water, for receiving corresponding echoes from obstructions in the paths of the sound waves including echoes from any fish in those paths, and for generating electrical signals in accordance with the received echoes; electrical transmitter means connected to the transducer means for controlling transmission of the sound waves by the transducer means; receiver means connected to the transducer means for receiving and processing the electrical signals produced by the transducer means and for producing an output in accordance therewith; microprocessor means connected to the receiver means for converting the output of the receiver means into electrical data representative of display images of the at least two separate areas of the body of water; and visual display means, connected to said microprocessor means and including a screen, for simultaneously displaying images corresponding to the electrical data at separate locations on the screen to provide separate, simultaneous indications of the presence or absence of fish in the at least two separate areas.

The transducer means preferably comprises at least two transducers adapted to be mounted on the boat so as to transmit adjacent beams of sound into the body of water and the screen is preferably divided up into at least two side by side sections respectively dedicated to individual ones of the sound beams. As provided for above, three transducers are preferably used which produce left, center and right beams of sound relative to the boat and the screen is thus preferably divided up into three separate side by side sections.

Advantageously, the microprocessor means includes means for buffering the output received from the receiver means, for generating an individual chart map corresponding to the individual electrical signals produced by the echoes received in each of the paths, and a display image map in which the chart maps are simultaneously combined.

Other features and advantages of the invention will be set forth in, or apparent from, the detailed description of a preferred embodiment of the invention which follows.

BRIEF DESCRIPTION OF THE DRAWINGS

FIG. 3 is a further block diagram of the overall system in which the basic units are shown in a highly simplified manner and in which the basic units of the invention are also included;

FIG. 5 is a front elevational view of the display device of FIGS. 1 to 3 illustrating the display produced for the scene illustrated in FIG. 4.

DESCRIPTION OF THE INVENTION

Figure 1:
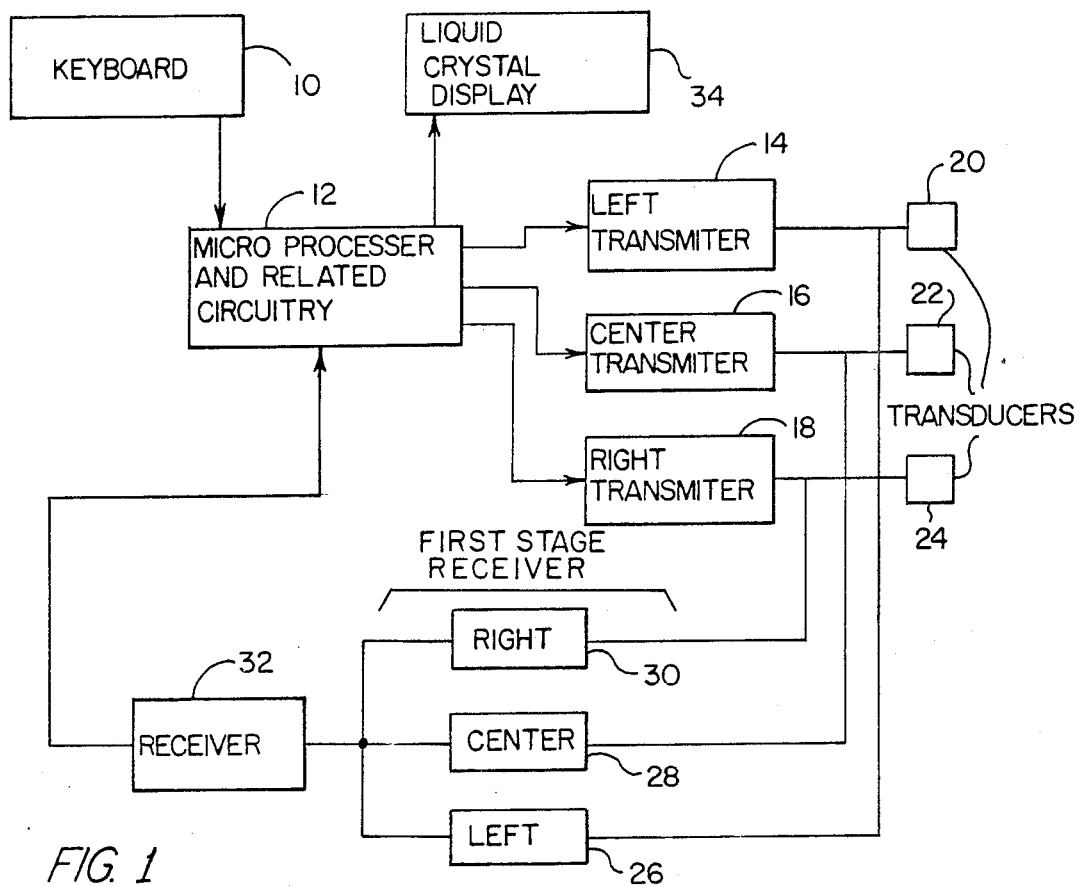
FIG. 1 is a block diagram of a sonar system of a type in which the present invention is to be incorporated.

Referring to FIG. 1, a highly simplified block diagram is provided of the basic units or components of a sonar "fish finder" system of the type in which the present invention is preferably incorporated. The system of FIG. 1 includes a keyboard 10 by which information can be inputted to a microprocessor 12 which controls the operation of three transmitters, viz., a left transmitter 14, a center transmitter 15, and a right transmitter 18, respectively associated with three transducer elements or transducers, viz., a left transducer 20, a center transducer 22, and a right transducer 24. It will be understood that the invention is not limited to three such transducers and that two transducers, or four or more transducers, could be used, although the use of three transducers is preferred.

As is explained in more detail below, the transducers 20, 22 and 24 are used to convert the electrical signals from transmitters 14, 16 and 18 into sound waves and to transmit these sound waves into the body of water in which the boat is located so that the sound waves are reflected by discontinuances or obstructions in the water, if any, and in any event, by the bottom, back to the transducers for conversion, back into electrical signals. These electrical signals produced by the individual transducers are received by a first stage receiver which comprises a left receiver 26 which receives signals from transducer 20, a center receiver 28 which receives signals from transducer 22 and a right receiver 30 which receives signals from transducer 24. After processing by a further receiver unit 32 (which includes further processing stages or units as explained below) the signals are supplied to a microprocessor 12 which is also connected to a display device 34, preferably a liquid crystal display, for displaying the outputs of the transducers in a manner described in more detail herein below.

Figure 4:
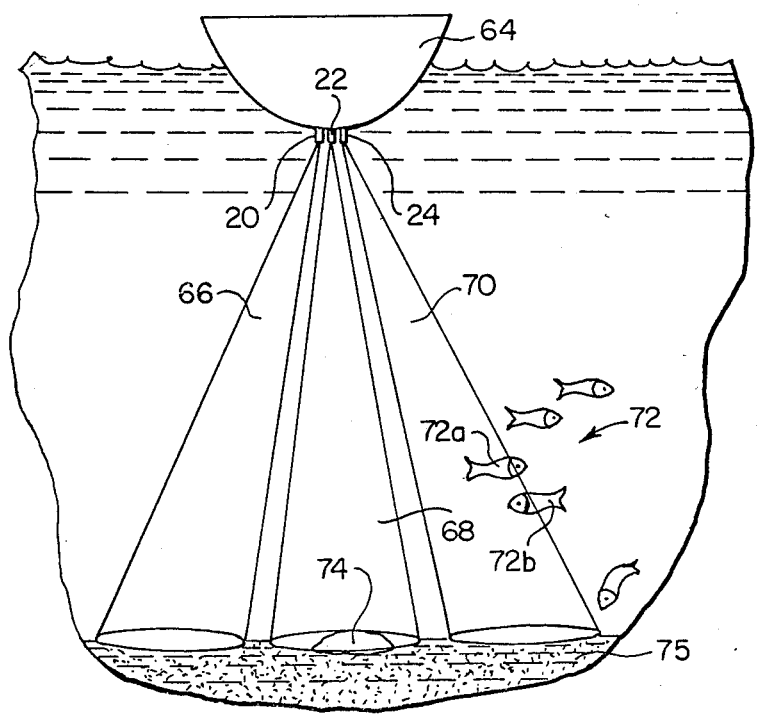
FIG. 4 is a schematic representation of a boat incorporating the system of the invention showing the transducers of that system as well as typical sound waves produced thereby.
Figure 2:
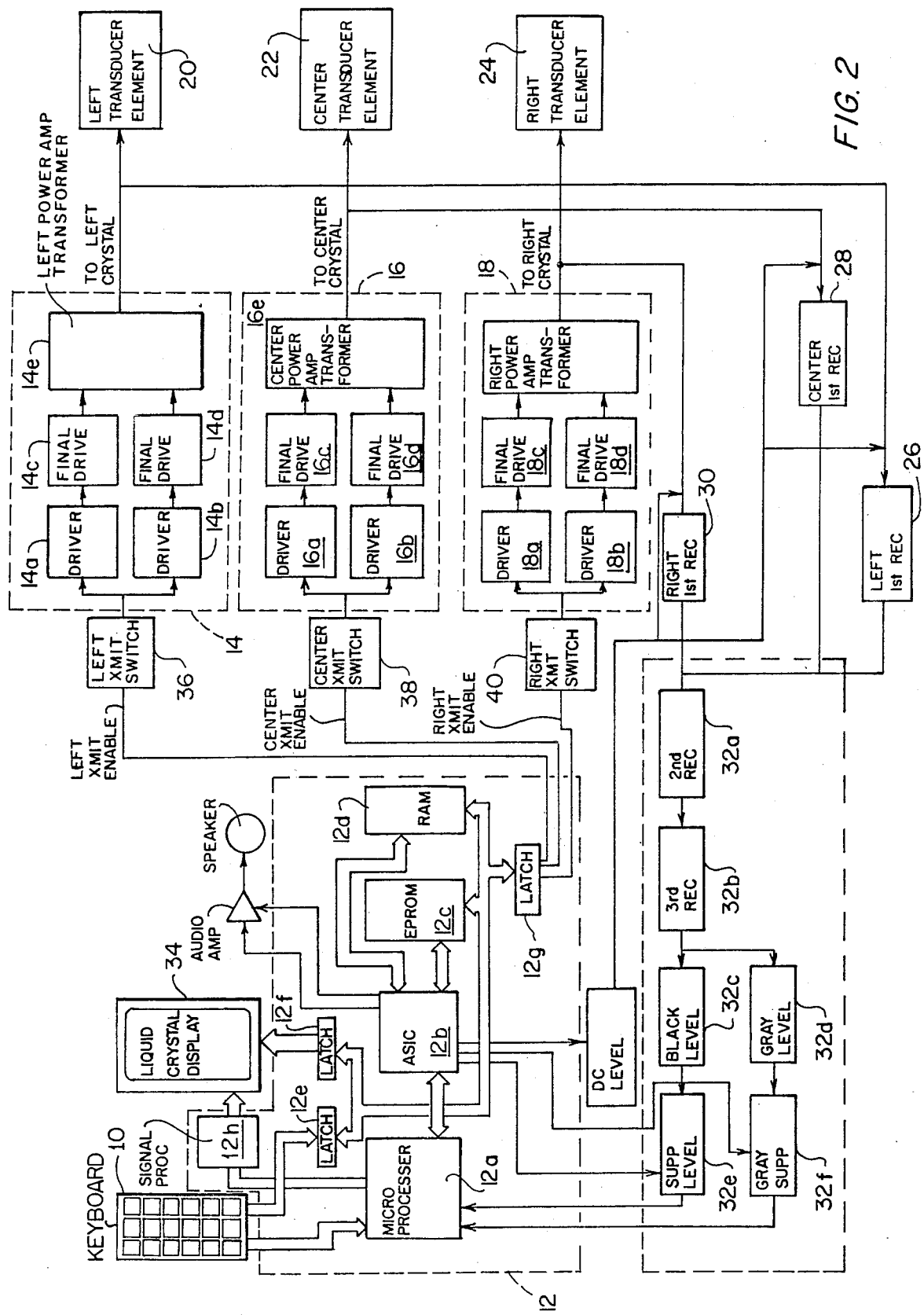
FIG. 2 is a more detailed block diagram of a system of FIG. 1.

Referring to FIG. 2, a more detailed block diagram of the system of FIG. 1 is illustrated. As shown, the microprocessor unit 12 of FIG. 1 includes a microprocessor 12a, an ASIC unit 12b, an erasable programmable memory 12c, a random access memory 12d and three latching circuits 12e, 12f and 12g as well as a "signal processing" unit which has been shown separately from microprocessor 12a and separately denoted 12h and which is described in more detail below in connection with FIG. 4.

As indicated in FIG. 2, three different enable signals are produced at the output of latching circuit or latch 12g for controlling three switching control switches 36, 38 and 40 individually associated with respective transmitters 14, 16 and 18.

As is also illustrated in FIG. 2, each transmitter 14, 16 and 18 is made up of a number of units which are the same for each transmitter. Thus, considering transmitter 14 as exemplary, the output of associated transmitter switch 36 is connected to a pair of driver circuits 14a and 14b which are, in turn, connected through final driver stages 14c and 14d to the inputs of a power amplifier-transformer 14e. As discussed above in connection with FIG. 1, the outputs of transmitters 14, 16 and 18 are individually connected to the respective transducers 20, 22 and 24.

As was also discussed above, receivers 26, 28 and 30 are individually connected to respective transducers 20, 22 and 24 and the outputs thereof connected to a further receiver stage 32. The latter, as illustrated in FIG. 2, includes a second stage receiver 32a, a third stage receiver 32b, a black level threshold circuit 32c which is used to determine the ultimate location of the "black" areas on the display screen, a gray level threshold circuit 32d which is used to determine the ultimate location of the "gray" areas on the display screen, a level suppression circuit 32e which suppresses signals from circuit 32c which do not exceed a threshold pulse length, and a "gray" suppression circuit 32e which suppresses signals from circuit 32d which do not exceed a threshold pulse length. The outputs of suppression circuits 32e and 32f form inputs to microprocessor 12a of microprocessor unit 12. A D.C. level circuit 42 provides a D.C. level at the inputs of first stage receivers 26, 28 and 30.

An audio amplifier 46 amplifies signals from ASIC 12b and applies these signals to a loudspeaker 48 to provide an audio output.

Referring to FIG. 3, a further, highly simplified block diagram of the system of FIGS. 1 and 2 is provided which the basic electrical circuitry has been re-drawn and wherein the component units of the "signal processing" unit 12h of FIG. 2 are indicated schematically. In FIG. 3, the outputs of microprocessor 12a are connected to three filter buffers, viz., a left filter buffer 50, a center filter buffer 52 and a right filter buffer 54, for temporary storage. The outputs of these buffers 50, 52 and 54 are individually connected to respective ones of three chart maps, a left chart map 56, a center chart map 58 and a right chart map 60. The outputs of the latter are connected to display image map 62 which is, in turn, connected to the display 34 described above. The operation of these units is described below.

Referring to FIG. 3, a schematic representation is provided of a boat 64 (viewed from the stern) which has on board a system as described above including the three transducers 20, 22 and 24. As illustrated, transducers 20, 22 and 24 are oriented so as to produce three separate, generally conical, "beams" of sound in side by side relationship, a left beam 66, a center beam 68 and a right beam 70. As indicated, a school of fish 72 is located on the right side of the boat 50 and two of the fish, denoted 72a and 72b, are located partially within right beam 70. In addition, a rock 74 is indicated as projecting u from the bottom 75.

Considering the overall operation of the system of FIGS. 1 to 3, and referring also to FIG. 5 which shows the face of the display device 34, the liquid crystal graph display screen, generally indicated at 76, provides a record of the return echoes received by the system. In a specific embodiment, the display 74 includes eighty-two pixels vertically and thirty-two pixels horizontally in the dot matrix area (screen face) shown. In general, with such displays, each time a corresponding transmitter is activated or fired, the top pixel in the first vertical row on the right side of the display is turned on, this constituting the so-called zero mark of the display. Such a transmitter, e.g., transmitter 14, when activated, fires a short burst (typically 200–1200 microseconds in length) of energy (typically at 192kHz) into a corresponding transducer, e.g., transducer 20, which is acoustically coupled to water. In particular, the transducer converts the electrical energy of the pulse into mechanical energy causing a sound wave to be generated. As mentioned above, the sound will reflect off any discontinuances in its path and will, in any event, be reflected off the bottom back to the corresponding transducer. Thus, referring to FIG. 4, sound will be reflected off fish 72a, 72b and off of rock 74, as well as off the bottom 75. The reflected sound or "echo" is received by the corresponding transducer, e.g., 20, which converts the sound into corresponding electrical signals that are detected, shaped, amplified and otherwise processed in the receiver circuitry including the first stage receiver, e.g., receiver 26, as well as receiver unit 32. This processing is conventional in these systems and some of the special processing has been mentioned above. The output of receiver unit 32 is applied to microprocessor unit 12 which, in turn, produces a signal which tells display 34 which pixels to turn on. The depth of an object which reflected an echo can be read by comparing the location thereof with one or the other of two depth scales 77 provided along the lateral edges of the display matrix or screen 76. After the echoes are displayed on the display screen, the pixels are scrolled left one column.

The system of the invention preferably includes digital sonar which is enabled at this time and which uses the same hardware, (e.g., the same transmitter, receiver and liquid crystal display) but processes the return echoes differently. In particular, noise, surface clutter, fish echoes and the like —all echoes except those from the bottom—are eliminated so that signal is provided which is a true indication of the depth of the bottom and this depth is also displayed on the liquid crystal display screen 76 as a digital number. This kind of digital display is conventional. As indicated in FIG. 5, the display matrix or screen 76 is divided by vertical lines into three separate parts or sections 78, 80 and 82 which are disposed in side by side relationship. These sections represent the left, center and right areas under the boat as "viewed" by transducers 20, 22 and 24 respectively. Generation of the display is initiated in the same way as described above for the general case. Thus, referring to FIG. 3, the left transmitter 14 fires a burst of electrical energy into left transducer 20 for conversion into mechanical energy and transmission, as a sound wave into the water. Return echoes strike transducer 20 and are converted into electrical energy, with the resultant electrical signal being processed by the left receiver 26, the follow-on receiver unit 32 (not shown in FIG. 3) and the microprocessor 12a to produce a noise filtered digital signal. This signal is then supplied from microprocessor 12a to left filter buffer 50 and is stored therein.

The same process is then repeated for the center and right transducers 22 and 24, so that center filter buffer 52 and right filter buffer 54 also filled. After all three filter buffers 50, 52 and 54 are filled with filtered data, a simultaneous scroll is made from all three filter buffers into the corresponding chart maps 56, 58 and 60. It will be understood that the contents of each of the filter buffers 50, 52 and 54 are scrolled into the respective chart maps 56, 68 and 60 at the same time in order to produce a synchronized display image. The chart maps 56, 58 and 60 hold "history" data from as many transmissions as are required to fill one display screen.

Continuing the process, the first third of each chart map 56, 58 and 60 is then supplied to the display image memory map 62 with "left" data being produced on the left section of the map 62, center data on the center section, and right data on the right section. Digital numbers (such as those indicating the bottom depth referred to above) and other indicators or "annunciators" are overlaid on top of the map data. The display image memory map 62 comprises a memory which is filled with data that represents exactly the image to be displayed on the screen 76 and combines data from all three chart maps 56, 58 and 60 into a single display image. As a final step the data or image stored by display image memory map 62 is simply transferred or supplied to image display device 34 where it is displayed on screen 76 so as to be visible to the user.

It will be understood that although filter buffers 50, 52 and 54, chart maps 56, 58 and 60 and display image memory map 62 are shown as separate elements, their functions can be implemented in software by the microprocessor 12.

It will be seen from the exemplary image indicated in Figure 5 that the display screen 76 provides an indication of the fish 72a and 72b, at 72a, and 72b, in the right section 82 of the screen 76 and of the rock 74 at 74, in the center section 80 of the screen 76. It will be appreciated that this display pattern clearly indicates to the fisherman that the fish are presently located on the right side of the boat and thus that he or she should fish on that side.

It will be appreciated that although separate transmitters have been shown for each transducer, a single transmitter could be used which would be switched sequentially between the transducers. Similarly, a single receiver can be used which is switched sequentially between the transducers so that a system could employ a single transmitter and a single receiver or different combinations of single and multiple transmitters and receivers. In addition, a single transmitter can be used which transmits to all transducers simultaneously, and reception by the transducers can again be effected sequentially, by providing that the transducers are individually switched to, or otherwise placed in, a receive mode, in sequence.

Although the present invention has been described relative to exemplary embodiments thereof, it will be understood by those skilled in the art that variations and modifications can be effected in these exemplary embodiments without departing from the scope and spirit of the invention.

We claim:

1. A fish finder system for a boat and other watercraft for determining and displaying the location of fish or other targets in the body of water surrounding the boat, said system comprising:

electromechanical transducer means for transmitting sound waves into the body of water along three separate paths, substantially in the form of three closely spaced, conically shaped sound beams, respectively directed centrally under the boat and to left and right sides thereof into three corresponding areas of the body of water, for receiving corresponding echoes from obstructions in the paths of said sound waves including echoes from any fish in said paths and for generally electrical signals in accordance with the received echoes;

electrical transmitter means connected to said transducer means for controlling transmission of said sound waves by said transducer means;

receiver means connected to said transducer means for receiving and processing the electrical signals produced by said transducer means and for producing an output in accordance therewith;

microprocessor means connected to said receiver means for converting the output of said receiver means into electrical data representative of display images of the three areas of the body of water; and visual display means, connected to said microprocessor means and including a screen, for simultaneously displaying images in the form of cross sections of the water in the three areas corresponding to said electrical data at three separate side by side locations on said screen to provide separate, simultaneous indications of the presence or absence of fish in the three areas.

2. A system as claimed in claim 1 wherein said transmitter means comprises a plurality of transmitters.

3. A system as claimed in claim 1 wherein said transducer means comprises a plurality of transducers.

4. A system as claimed in claim 1 wherein said microprocessor means includes means for generating three individual chart maps corresponding to the electrical signals produced by the echoes received in each said path, and a display image map in which the chart maps are simultaneously combined.

5. A system as claimed in claim 1 wherein said visual display means comprises a liquid crystal display device.

6. A system as claimed in claim 1 wherein said transducer means comprises a plurality of transducers and said transmitter means comprises a single switchable transmitter which is switched sequentially between each transducer of said plurality of transducers.

7. A system as claimed in claim 1 wherein said transducer means comprises a plurality of transducers and said receiver means comprises a single switchable receiver which is switched sequentially between each transducer of said plurality of transducers.

8. A system as claimed in claim 7 wherein said transmitter means comprises a single switchable transmitter which is switched sequentially between each transducer of said plurality of transducers.

9. A sonar system for a boat and other watercraft for determining the location of obstructions, including the bottom, in the body of water surrounding the boat, said system comprising:

electromechanical transducer means for transmitting sound waves into the body of water along at least three separate paths, substantially in the form of three closely spaced, conically shaped beams respectively directed centrally under the boat and to left and right sides thereof into at least three corresponding areas of the body of water, for receiving corresponding echoes from obstructions in the paths of said sound waves and for generating electrical signals in accordance with the received echoes;

electrical transmitter means connected to said transducer means for controlling transmission of said sound waves by said transducer means;

receiver means connected to said transducer means for receiving and processing the electrical signals produced by said transducer means and for producing an output in accordance therewith;

microprocessor means connected to said receiver means for converting the output of said receiver means into electrical data representative of display images of the at least three separate areas of the body of water; and visual display means, connected to said microprocessor means and including a screen, for simultaneously displaying images in the form of cross sections of the water in the three areas corresponding to said electrical data in at least three separate laterally adjacent locations on said screen to provide separate, simultaneous indications of the presence or absence of obstructions in said at least three areas including an indication of the location of the bottom, said microprocessor means including means for generating three individual chart maps corresponding to the electrical signals produced by the echoes received in each said path, and a display image map in which the chart maps are simultaneously combined.

10. A system as claimed in claim 9 wherein said visual display means comprises a liquid crystal display device.

11. A system as claimed in claim 9 wherein said transmitter means comprises a plurality of transmitters.

12. A system as claimed in claim 9 wherein said transducer means comprises three individual transducer elements.

* * * * *